(12) United States Patent
Muske (10) Patent No.: US 10,747,641 B2
(45) Date of Patent: Aug. 18, 2020

(54) SYSTEM AND METHOD FOR CAUSE POINT ANALYSIS FOR EFFECTIVE HANDLING OF STATIC ANALYSIS ALARMS

(71) Applicant: Tata Consultancy Services Limited, Mumbai (IN)

(72) Inventor: Tukaram B Muske, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/675,110

(22) Filed: Aug. 11, 2017

(65) Prior Publication Data

US 2018/0046564 A1  Feb. 15, 2018

(30) Foreign Application Priority Data

Aug. 11, 2016 (IN) .............................. 201621027511

(51) Int. Cl.
*G06F 9/44* (2018.01)
*G06F 11/36* (2006.01)
*G06F 8/75* (2018.01)
*G06F 8/41* (2018.01)
*G06F 8/33* (2018.01)

(52) U.S. Cl.
CPC ............ *G06F 11/3604* (2013.01); *G06F 8/43* (2013.01); *G06F 8/75* (2013.01); *G06F 11/3624* (2013.01); *G06F 11/3664* (2013.01); *G06F 11/3684* (2013.01); *G06F 8/33* (2013.01); *G06F 11/3672* (2013.01)

(58) Field of Classification Search
CPC .... G06F 11/36; G06F 11/3604; G06F 11/362; G06F 11/368; G06F 11/3672; G06F 11/3684; G06F 11/3624; G06F 11/3608; G06F 8/75; G06F 8/43; G06F 8/433; G06F 8/436; G06F 8/434; G06F 8/437
See application file for complete search history.

(56) References Cited

U.S. PATENT DOCUMENTS 8,359,584 B2 * 1/2013 Rao .................... G06F 11/3624
 717/128
8,881,116 B2 * 11/2014 Mulat ................. G06F 11/3608
 717/126

(Continued)

FOREIGN PATENT DOCUMENTS

CN  103294594  9/2013

*Primary Examiner* — Qamrun Nahar
(74) *Attorney, Agent, or Firm* — Finnegan, Henderson, Farabow, Garrett & Dunner, LLP (57) ABSTRACT

A method and system is disclosed herein to identify causes of alarms generated corresponding to each alarm of the static analysis. The system models the basic reasons for alarms as alarm cause points of several types. Further, the system ranks these cause points based on different metrics such as unknown type-based ranking, grouping of cause points based on their lexical similarity or proximity and last but not least contribution score based ranking. The system also uses a workflow in which a user answers queries about the cause points and their answers are used in subsequent round of the static analysis. The collaboration between the answers of the user and the static analysis helps the tool to resolve the unknowns encountered during the analysis and weeding out the alarms. It also helps the user to expedite the manual inspections of alarms.

14 Claims, 3 Drawing Sheets

(56) References Cited

U.S. PATENT DOCUMENTS

| | | | | |
|---|---|---|---|---|
| 9,158,922 B2* | 10/2015 | Liu | ................ | G06F 21/577 |
| 9,201,765 B2* | 12/2015 | Muske | ................ | G06F 11/3604 |
| 9,384,017 B2* | 7/2016 | Muske | ................ | G06F 11/3604 |
| 2010/0058475 A1* | 3/2010 | Thummalapenta | ... | G06F 21/577 |
| | | | | 726/25 |
| 2011/0154300 A1* | 6/2011 | Rao | ................ | G06F 11/3624 |
| | | | | 717/133 |
| 2011/0296388 A1* | 12/2011 | Rohde | ................ | G06F 8/433 |
| | | | | 717/131 |
| 2012/0054724 A1* | 3/2012 | Kalman | ................ | G06F 8/75 |
| | | | | 717/131 |
| 2012/0167060 A1* | 6/2012 | Landwehr | ................ | G06F 11/3604 |
| | | | | 717/132 |
| 2012/0317554 A1* | 12/2012 | Mulat | ................ | G06F 11/3608 |
| | | | | 717/131 |
| 2013/0212565 A1* | 8/2013 | Nishiyama | ................ | G06F 17/30286 |
| | | | | 717/131 |
| 2014/0053130 A1 | 2/2014 | Pistoia et al. | | |
| 2014/0244645 A1* | 8/2014 | Muske | ................ | G06F 9/44589 |
| | | | | 707/737 |
| 2014/0359776 A1* | 12/2014 | Liu | ................ | G06F 21/577 |
| | | | | 726/25 |
| 2015/0052505 A1 | 2/2015 | Mulat | | |
| 2015/0121345 A1* | 4/2015 | Muske | ................ | G06F 11/3664 |
| | | | | 717/125 |
| 2018/0046564 A1* | 2/2018 | Muske | ................ | G06F 11/3604 |

* cited by examiner

SYSTEM AND METHOD FOR CAUSE POINT ANALYSIS FOR EFFECTIVE HANDLING OF STATIC ANALYSIS ALARMS

PRIORITY CLAIM

This U.S. patent application claims priority under 35 U.S.C. § 119 to India Application No. 201621027511, filed on Aug. 11, 2016. The entire contents of the aforementioned application are incorporated herein by reference.

TECHNICAL FIELD

The present subject matter described herein, in general, relates to identification and analysis of cause point of each of one or more alarms generated while static analysis of an application code, and more particularly system and method for manual inspection of static analysis using an interactive and iterative static analysis and using the causes of the alarms to classify the respective alarms into true and false alarms.

BACKGROUND

A static analysis technique for defects detection in an application code has been widely used in practice for ensuring software quality and reliability of software through early detection of software defects. However, each of the alarm of one or more alarms generated is still a serious concern and it requires user's attention to classify it into true error or false warning (false positive) through manual inspection of the alarms.

Static analysis is performed by a tool called as static analysis tool and a static analysis tool usually results in one or more alarms. While it aims to report the program points of interest either as safe program points or error program points. The one or more alarms generated are the warning messages or simply the warnings to the user about a possible run-time error when the static analysis tool performing the static analysis is unable to decide their corresponding program points as errors or safe program points. A user is supposed to analyze each alarm manually. Each alarm requires dealing with utmost care, as the analysis of alarms is required to verify a software application. The review of alarm provides an assurance that there will be no system failure or an error at run-time by uncovering the true errors from the alarms generated through static analysis. This manual review of alarms is costlier, highly time consuming and tedious. Also, a repetitive manual review of alarms makes the analysis work of a user less interesting.

Accordingly, the present system and method is to identify one or more cause points of the alarms generated while carrying static analysis of the application code and to use alarm cause points for efficient and effective manual inspection of the alarms.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and a method for identifying at least one cause point of each of one or more alarms generated during static analysis of an application code, reporting one or more cause points along with the one or more alarms, and using the cause points for efficient and effective manual inspections of the alarms by user. The disclosure also provides a system and method for analyzing the source code for identifying at least one cause point of each of the one or more alarms resulting from the static analysis of an application code. The cause point analysis, identifying the cause points of the alarms generated, reduces the manual effort in inspection of the one or more alarms and allows to inspect more number of alarms and also identify more errors in a given amount time. The cause point analysis can be performed during or after the source code analysis of the static analysis. It would be appreciated that the cause points mean the program points that cause imprecision in the static analysis and not a root cause for an error.

In one aspect, a method is disclosed for identifying at least one cause point of each of the one or more alarms resulting from the static analysis of the application code for inspection of the one or more alarms. It identifies one or more reasons that generate the one or more alarms and at least one cause point to each of the generated one or more alarms. The identified at least one cause point is classified into various types depending on the program statements in which the cause point appears and source for imprecision of the analysis. Further, it has at least one unknown variable associated with the cause point. It would be noted that the sources of imprecision in static analysis are denoted as unknowns and these are variables for which values cannot be computed precisely during the static analysis of the application code. The sources of imprecision and program statements in which cause points appear, or thus the unknowns in the static analysis, may vary as per the programming languages like C, C++, and Java. Thus, it would be appreciated that the cause points identified and their different types may vary depending on the programming language of application code being checked by the static analysis.

Further, the method defines three metrics to prioritize the identified cause points and to rank the cause points accordingly. These metrics are cause point type, contribution score, and their similarity and spatial proximity. The ranking of cause points allows the user to review more number of alarms in a given time and also to identify more number of errors in a given time. Further, the proposed ranking scheme is customizable so that user can modify or customize the criteria used to rank the alarm cause points depending on his requirement. Information about the unknowns in the cause points is asked to user in the form of queries where every cause point identified has one or more queries associated with it. A systematic approach is used to frame the queries that are presented to the user. Using the user inputs that are answers to the queries, the static analysis is performed again due to which the alarms corresponding to the answered cause points may get resolved. The process is repeated until no more alarms are generated by the static analysis.

In another aspect, a system is disclosed for identifying at least one cause point of each of the one or more alarms resulting from the static analysis of the application code for inspection of the one or more alarms. The system comprises a processor, a memory communicatively coupled to the processor and the memory contains instructions that are readable by the processor. Further, the system comprises a static analysis module, a cause point analysis module, a query generation module, a ranking module, a grouping module, and an interactive module. The system identifies one or more reasons that generate the one or more alarms, and using these reasons the system identifies at least one cause point to each of the generated one or more alarms. The identified at least one cause point is classified into various types depending on the program statements in which the cause point appears and the type of the source for imprecision of the analysis. Further, it has at least one unknown variable associated with the cause point. It would be noted that the sources of imprecision in static analysis are denoted as unknowns and these are variables for which values cannot be computed precisely during the static analysis of the application code. The sources of imprecision and program statements in which cause points appear, or thus the unknowns in the static analysis, may vary as per the programming languages like C, C++, and Java. Thus, it would be appreciated that the cause points identified and their different types may vary depending on the programming language of application code being checked by the static analysis.

Further, the system defines three metrics to prioritize the identified cause points and to rank the cause points accordingly. These metrics are cause point type, contribution score, and their similarity and spatial proximity. The ranking of cause points allows the user to review more number of alarms in a given time and also to identify more number of errors in a given time. Further, the proposed ranking scheme is customizable so that user can modify or customize the criteria used to rank the alarm cause points depending on his requirement. Information about the unknowns in the cause points is asked to user in the form of queries where every cause point identified has one or more queries associated with it. A systematic approach is used to frame the queries that are presented to the user. Using the user inputs that are answers to the queries, the static analysis is performed again due to which the alarms corresponding to the answered cause points may get resolved. The process is repeated until no more alarms are generated by the static analysis.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

Some embodiments of this disclosure, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described. In the following description for the purpose of explanation and understanding reference has been made to numerous embodiments for which the intent is not to limit the scope of the disclosure.

One or more components of the disclosure are described as module for the understanding of the specification. For example, a module may include self-contained component in a hardware circuit comprising of logical gate, semiconductor device, integrated circuits or any other discrete component. The module may also be a part of any software program executed by any hardware entity for example processor. The implementation of module as a software program may include a set of logical instructions to be executed by a processor or any other hardware entity.

The disclosed embodiments are merely exemplary of the disclosure, which may be embodied in various forms.

The elements illustrated in the figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition alarm system and method may be stored on, distributed across, or read from other machine-readable media.

Method steps of the disclosure may be performed by one or more computer processors executing a program tangibly embodied on a computer-readable medium to perform functions of the disclosure by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store)

programs and data to, a non-transitory computer-readable storage medium such as an internal disk (not shown) or a removable disk

GLOSSARY—TERMS USED IN THE EMBODIMENTS WITH EXPLANATION

The disclosure defines herein a few terms and concepts to understand the disclosure to a person skilled in the art. To achieve a satisfactory precision in static analysis is difficult primarily because the values of certain variables or program statements are simply unknown statically. Such values have to be generally treated as nondeterministic choices while performing the static analysis and the tool performing the analysis results in a plethora of alarms due to these unknowns. The classification of these unknown depends on the basic operations that provide values to the unknown variables. The classification of unknowns is as follows—

- i-unknowns: The i-unknowns arise due to unknown values of program inputs, the values received as input from the user, real from network or file or sensors, linked at load-time, etc.
- c-unknowns: The c-unknowns are computational unknowns resulting from approximation of complex computations in the program. Example, a non-linear arithmetic such as ratio*a*b+ size is a c-unknown.
- loop-unknowns: There are many unknowns in practice that are generated due to loops whose bounds cannot be determined statically.
- ds-unknowns: The ds-unknowns result due to abstracting the values of unbounded data structures like list, stack, queue or even the arrays.
- lib-unknowns: The lib-unknowns corresponds to the unknowns resulting from calls to library or external functions whose body is not available for analysis.
- p-unknowns: The p-unknowns correspond to not knowing infeasibility of certain execution paths carrying known but unsafe value to the alarm program point.

The disclosure proposed herein is a system and a method for identifying at least one cause point of each one or more alarms of the static analysis and using the identified cause points for efficient and effective manual inspections of the alarms by performing interactive and iterative operation of static analysis.

Figure 1:
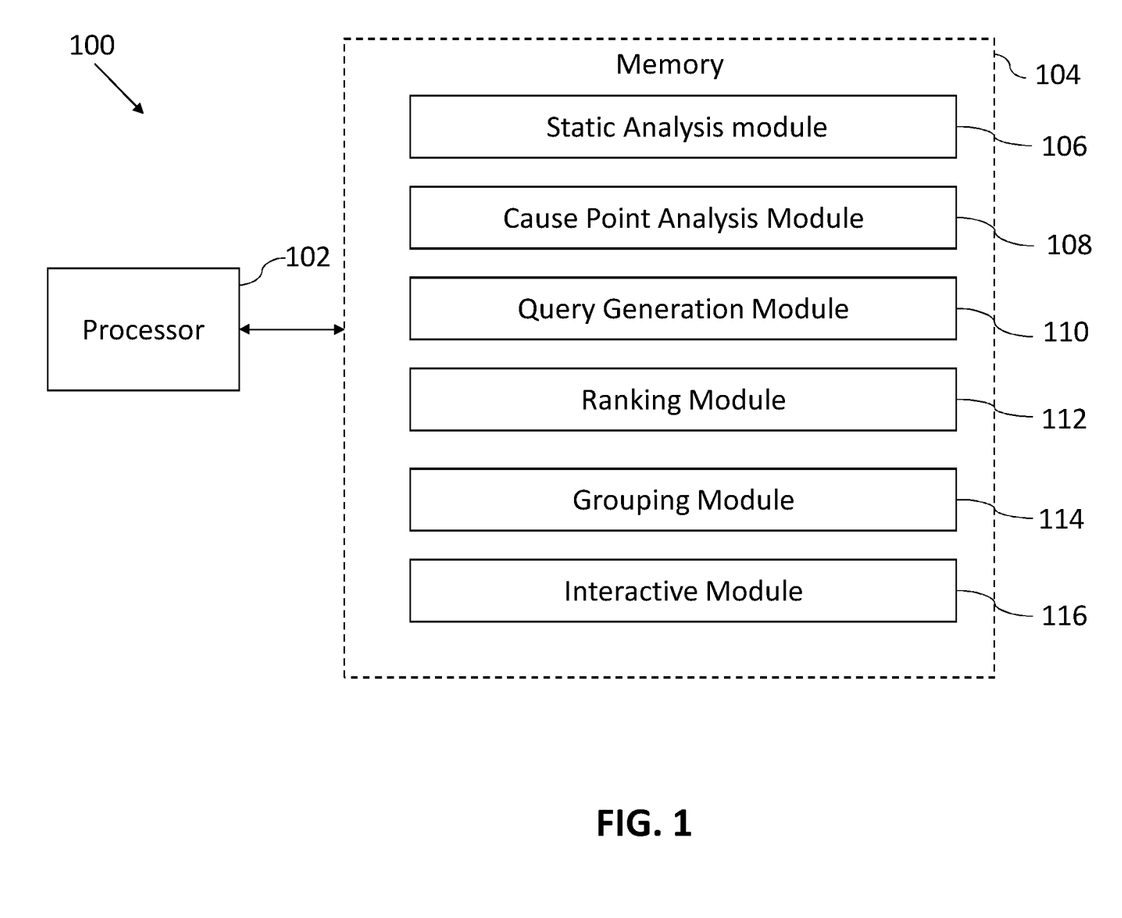
FIG. 1 is a block diagram showing a system for identifying at least one cause point of each one or more alarms of the static analysis and using the cause points for efficient and effective manual inspection of the alarms according to an embodiment of the present disclosure.

Referring FIG. 1, a system 100 for identifying at least one cause point of each of the one or more alarms of the static analysis of application code for inspection of the one or more alarms. The system comprises a processor 102, a memory 104 communicatively coupled to the processor and the memory contains instructions that are readable by the processor, a static analysis module 106, a cause point analysis module 108, an query generation module 110, a ranking module 112, a grouping module 114 and an interactive module 116.

In the preferred embodiment, the static analysis module 106 of the system 100 carrying out static analysis over the application code to identify at least one or more alarms of the run-time error types such as array out of bound (AIOB), divide by zero (ZD) and overflow underflow (OFUF). In the static analysis, the values of certain variables or program statements cannot be known always as they are referred to as one or more unknowns. The one or more unknowns can be classified into several categories based on their basic operation (source for unknown values). In such cases, for these one or more unknowns all possible values are assumed by the tool performing the static analysis which leads to the one or more alarms. These one or more alarms are different from the actual errors reported by the tools and they are warning messages to the user as the tool is not sure about the run-time errors at their corresponding program points.

In the preferred embodiment, the cause point analysis module 108 of the system 100 is configured to identify at least one cause point for each of the one or more unknowns and in turn the at least one cause point for one or more alarms generated during the static analysis. The at least one cause point of the one or more alarms is a reason due to which one or more values of program variables appearing in alarm expressions are unknowns during the static analysis of the application code. The alarm expressions denote program expressions for which the one or more alarms are reported and the unknowns denote the program variables for which the static analysis is unable to compute their values as required during the static analysis of the application code. The at least one cause point of each of the one or more alarms causing one or more unknowns as alarm cause points by associating them with a type and their corresponding program points. The type of the cause points may be classified based on their basic operation. It would be appreciated that the origin of each unknown values may vary depending on the programming language and the granularity of the modeling and thus the cause points identified for the static analysis alarms may also vary depending on the programming language and modeling of the unknowns.

Further, the cause point analysis module 108 of the system 100 is also configured to model the cause point for one or more unknowns and in turn the at least one cause point of each of the one or more alarms generated during the static analysis. It is to be noted that at each program point that causes a variable to be an unknown is referred as a cause point to the alarms. The cause point of first unknown at one program point may also be a cause point for second unknown at another program point if the second unknown receives its values from the first unknown transitively. Thus, only the basic operations leading to the one or more unknowns directly or transitively are modeled as cause points. The alarm expression is a program expression corresponding to each alarm and for which the warning message about the possible run-time error is being reported.

Further, the system 100 associate at least one origin of the unknown values with its program point that causes a variable to be an unknown and augment the association with its unknown type. Herein, the origin may be either an expression or a loop statement. It would be appreciated that the cause point modeling by associating at least one origin of the unknown values with its program point may not be sufficient for alarms that are generated due to approximations of execution paths by the control flow paths. Thus, the system 100 is also configured for modeling the cause points related to the path infeasibility. The alarm results due to inability of analysis to determine the infeasibility of the path in which a known but unsafe value reaches to the alarm point. It would be appreciated that only a few alarms may be generated due to the path

TABLE 1

| | | |
|---|---|---|
| 1. | const int arr1[ ]={0,3,7,9,14,22,34}; | |
| 2. | char arr2[35], str[20], bound, tmp; | |
| 3. | | |
| 4. | void foo( ){ | |
| 5. |    unsigned int i, j, k, length; | |
| 6. |    ... // some code | |
| 7. |    scanf("%s", str) | //Cause point $CP_7$ |
| 8. |    if(i < 7 && j < i) | |
| 9. |       bound=arr1[i]–arr1[j] | //Cause point $CP_9$ |

TABLE 1-continued

```
10.
11.         for(k = 0; k <= bound; k++{ //OFUF
12.             f1(k);
13.         }
14.         length = strlen(str);
15.         f2(bound, length);
16.     }
17.
18.     void f1(int p){
19.         if(nondet( )) arr2 [p = 0; //AIOB
20.         else arr2 [p] = 1; //AIOB
21.     }
22.
23.     void f2(int p, unsigned int q){
24.         arr2 [p − 1] = 100 / q; //AIOB, ZD
25.         tmp1 = str [q]; //AIOB
26.     }
``` infeasibility.

Referring table 1, as an example, where a sound static analyzer generates six alarms such as four instances of AIOB, one instance of ZD, and one instance of OFUF. The sound static analyzer reports these alarms because it is unable to discover the precise value of variables str at line 7 and bound at line 9. Therefore, the cause point analysis module 108 identifies the two causes as $CP_7$ and $CP_9$ at line 7 and line 9 respectively and also seeks values of the variables str and bound at these points from the user in order to resolve the alarms. A cause point of an unknown u at a program point p is also a cause point for another unknown v at a program point q if v receives its values from u transitively through some path from p to q. Thus, only basic operations leading to unknowns directly or transitively are modeled as cause points. The cause points of unknowns in the program expression corresponding to an alarm generated are referred to as cause point of the alarm.

In the preferred embodiment, the query generation module 110 is configured to generate one or more queries corresponding to each of the identified cause points. The one or more queries are generated by identifying required values for each of the one or more unknowns at each of the cause points. The required values represent necessary pre-condition on the unknown such that the values never result the alarms into an error. The one or more queries are framed by inferring values of the unknown depending on the expression in the alarm and the verification property and by propagating the inferred values of the unknown from the alarm point to the cause point through background substitution of the values for transitively dependent variables. Further, when multiple alarms are caused due to a cause point, the necessary precondition on the cause point is computed as the combined requirement necessary for safety of corresponding one or more alarms.

In an example, wherein if answer of the user to a query corresponding to a cause point is YES, the next iteration of the user static analysis discharges the corresponding alarms, if the necessary pre-condition in the query is also sufficient condition for the safety of the alarms. And if the answer to a query is NO then the next iteration of the user analysis either the corresponding alarms are marked as true errors or the cause point in the query gets translated into a cause point of p-unknown type. Since the queries are formed based on the expected values, they encourage the user to think of expected behavior of the program thereby improving the understanding of the program state in terms of data invariants at the cause points. In another embodiment, to make the user interactions more effective, a query ought to be relevant, more specific and easy to answer in the context of inspection of the one or more alarms.

In the preferred embodiment, to improve the effectiveness of manual inspections of alarms, the ranking module 112 of the system 100 ranks the identified cause points of each of the one or more alarms. The cause points are ranked based on their unknown types in order of higher to lower priority. The one or more alarms caused by the higher priority cause points are more likely to be true errors and the one or more alarms caused by the other unknown types are likely to be false alarms. In unknown type-based ranking, the cause points are ranked based on their unknown type in order of i-unknown>lib-unknown>p-unknown>loop-unknown>c-unknown>ds-unknown. This ranking is based on the hypothesis that the alarms caused by i-unknowns and lib-unknowns are more likely to be true errors and alarms caused by c-unknowns and ds-unknowns are more likely to be false alarms.

Further, the cause points with i-unknown types are the sources for free variables in a program that operate in a partially defined environment, and failure to validate them mostly leads to an error due to certain assumptions made on the input values by user. The validated inputs are no longer unknowns due to the restrictions put during their validations. The implementation of lib functions generally adheres to the specification known to the user. However, many times the user misses to check the validity or the values returned to lib functions calls. Thus, the cause points of i-unknown and lib-unknown types are given higher priority. The cause point with p-unknown denotes presence of unsafe value and hence the infeasibility of the value reaching the alarm program point must be ensured. Furthermore, given the larger volume and high complexity of the application code in practice, the existence of a path carrying the unsafe value to the alarm program point in not likely. The cause points with loop-unknowns type includes the category of potentially infinite loops. The cause points of c-unknown and ds-unknown types are treated of lower priority because treating every complex arithmetic operation or every reading of a value from data structure itself reduces the probability of the cause point to cause an alarm as an error.

Furthermore, the ranking module 112 can also be configured to rank the cause points based on the contribution scores. For example, let $C\alpha$ be the set of cause points for an alarm $\alpha$. When $|C\alpha|=1$, $c \in C\alpha$ is said to cause a fully. Otherwise $c \in C\alpha$ is said to cause $\alpha$ partially. Let $S_c$ be the set of alarms that are caused due to a cause point c. To measure the contribution of c in causing $S_c$, we define two scores:

$$\text{full contribution score, } fc\text{-score}(c) = \sum_{a \in S_c, |C_a|=1} 1$$

$$\text{partial contribution score, } pc\text{-score}(c) = \sum_{a \in S_c, |C_a|>1} \frac{1}{|C_a|}$$

In one example, the total contribution score (tc-score) of a cause point c in alarms generation is computed as below, wherein a configurable factor $k \geq 2$ is used to weigh the fc-score higher than the pc-score.

$$tc\text{-score}(c) = fc\text{-score}(c) * k + pc\text{-score}(c)$$

where the tc-score is used to rank the cause points within a group formed and further the cause points with higher score are prioritized over the ones having lesser score. Composite tc-score is computed for a group as the sum of tc-scores of its grouped cause points, and this is used to rank the groups belonging to the same unknown-type category.

It would be appreciated that the ranking module 112 of system 100 may be customized by the user. The ranking scheme used to rank the cause points is allowed to be customized to suit to the requirements of the user, because customizability is an important aspect of a static analysis tool. User can use the contribution score based ranking as the primary criterion when he intends to manually inspect more number of warnings in a given time. The contribution score helps in reviewing more number of warnings in a given time because generally many warnings get generated during due to same cause point. Hence, resolving the unknown at a cause point can help in reviewing many warnings in one go. This way the cause point analysis allows for efficient inspection of the alarms. When contribution score is used as the primary ranking criterion, the other two criterion, namely unknown type and similarity and proximity based grouping, may be applied to the cause points that have similar contribution scores. User may customize the ranking module to use unknown type based ranking as the primary criterion when he intends to identify more number of errors in a given time.

In the preferred embodiment, the grouping module 114 of the system 100 is configured to group the ranked cause points depending on their lexical similarity or proximity or the both. It would be appreciated that the grouping of the cause points can be applied before or after the ranking of cause points based on their unknown-types. When a cause point cannot be grouped with any other cause point, it is treated as the only member of its own group. In the lexical similarity based grouping of similar cause points are grouped together so that answer to the questions or queries associated with the cause points in a group are answered together or in one go.

Referring an example, wherein all the cause points arising due to calls to the same library function, say readSensor( ), are grouped together presenting an opportunity to frame a query at the group level. The similarity identification may vary based on the type of unknown. For example, the identifiers representing data structures (resp. library functions) in cause points of ds-unknown (resp. lib-unknown) type are compared respectively. The entire cause point expression is matched for c-unknown and p-unknown type cause points. Cause points of i-unknown and loop-unknown types may be excluded from such grouping. In the proximity based grouping, where the cause points belonging to the same procedure are grouped so that their corresponding questions are answered together. This type of grouping reduces switching between multiple source files and procedures while answering a set of queries associated with the cause points.

In the preferred embodiment, the interactive module 116 of system 100 is configured to perform an interactive static analysis to resolve alarms by accepting inputs from a user for each of the cause points generating the one or more alarms. This module presents the queries generated corresponding to each of the cause points identified to the user. It receives inputs from the user for each of the cause points generating alarms as answers to the queries presented to the user. Further, the interactive module 116 may use an integrated review framework to report the alarm cause points and queries corresponding to them. The integrated review framework may be obtained by implementing a separate standalone tool or by extending an integrated development environment (IDE like Eclipse, Microsoft visual studio, NetBeans, etc.) to support code navigation and to interpret the results of the static analysis tool used. In an important aspect of the interactive module 116, the module also provides traceability from a cause point to the alarms caused by it and from an alarm to its cause points. The traceability may provide the user help in locating alarms generated by a cause point in a query being answered. For example, the user may be interested in knowing which are the alarms caused by the cause point corresponding to a query being answered when the answer to the query is NO.

In the preferred embodiment, the interactive module 116 supplies the inputs provided by the user as answers to the queries, to the static analysis module 106 and initiates a next iteration of the static analysis of the application code using the user inputs. The next iteration of the analysis is performed by the static analysis module 106 which generates the same number of lesser number of the alarms than the previous static analysis of the application code by the same module. The static analysis module 106 of system 100 performs an incremental analysis for the subsequent iteration of the static analysis with user inputs. The incremental analysis is to reduce the wait time between the two consecutive user interactions. Furthermore, the analysis of cause points using the cause point analysis module 108 and ranking of cause points using the ranking module is performed and the interactive module 116 again reports the queries corresponding to the cause points to accept user inputs. This way the static analysis is performed in multiple iterations and interactively, and the alarms are review efficiently and effectively due to the ranking of the cause points.

Figure 2:
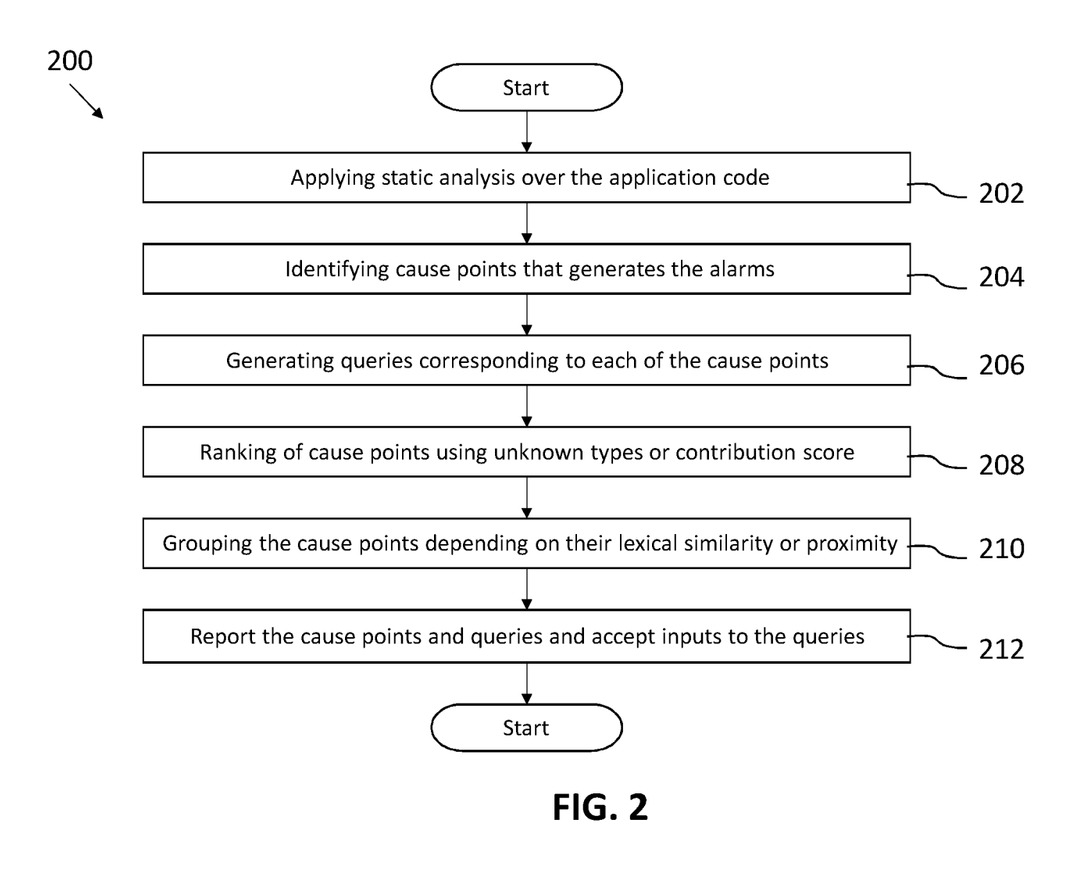
FIG. 2 illustrates a flow diagram showing a method for identifying at least one cause point of each one or more alarms of the static analysis and using the cause points for efficient and effective manual inspection of alarms according to an embodiment of the present disclosure.

Referring FIG. 2, a method 200 for identifying at least one cause point of each of the one or more alarms generated during static analysis of an application code for inspection of the one or more alarms.

The method starts at the step 202, wherein it applies static analysis using static analysis module 106 over the application code to identify at least one or more alarms of the run-time error types such as array out of bound (AIOB), divide by zero (ZD) and overflow underflow (OFUF). In the static analysis, the values of certain variables or program statements cannot be known always as they are referred to as one or more unknowns. The one or more unknowns can be classified into several categories based on their basic operation (source for unknown values). In such cases, for these one or more unknowns all possible values are assumed by the tool performing the static analysis which leads to the one or more alarms. These one or more alarms are different from the actual errors reported by the tools and they are warning messages to the user as the tool is not sure about the run-time errors at their corresponding program points.

At the step 204, the method identifies one or more reasons that generates the one or more alarms and models the reasons as at least one cause point to each of the generated one or more alarms using a cause point analysis module 108. It identifies at least one cause point for each of the one or more unknowns and in turn the at least one cause point for one or more alarms generated during the static analysis. The at least one cause point of the one or more alarms is a reason due to which one or more values of program variables appearing in alarm expressions are unknowns during the static analysis of the application code. The alarm expressions denote program expressions for which the one or more alarms are reported and the unknowns denote the program variables for which the static analysis is unable to compute their values as required during the static analysis of the application code.

The at least one cause point of each of the one or more alarms causing one or more unknowns as alarm cause points by associating them with a type and their corresponding program points. The type of the cause points may be classified based on their basic operation and the type of their corresponding unknowns. It would be appreciated that the origin of each unknown values may vary depending on the programming language and the granularity of the modeling and thus the cause points identified for the static analysis alarms may also vary depending on the programming language and modeling of the unknowns.

At the step 206, where the method generates one or more queries corresponding to each of the identified cause points using a query generation module 110. The one or more queries are generated by identifying required values for each of the one or more unknowns at each of the cause points. The required values represent necessary condition or sufficient condition on the unknown such that the values never result the alarms into an error. The one or more queries are framed by inferring values of the unknown depending on the expression in the alarm and the verification property and by propagating the inferred values of the unknown from the alarm point to the cause point through background substitution of the values for transitively dependent variables. Further, when multiple alarms are caused due to a cause point, the necessary condition or sufficient condition on the cause point is computed as the combined requirement necessary for safety of corresponding one or more alarms.

At the step 208, the method defines three metrics to prioritize the identified cause points and to rank the cause points accordingly using a ranking module 112. The cause points are ranked based on their unknown types in order of higher to lower priority. The one or more alarms caused by the higher priority cause points are more likely to be true errors and the one or more alarms caused by the other unknown types are likely to be false alarms. In unknown type-based ranking, the cause points are ranked based on their unknown type in order of i-unknown>lib-unknown>p-unknown>loop-unknown>c-unknown>ds-unknown. This ranking is based on the hypothesis that the alarms caused by i-unknowns and lib-unknowns are more likely to be true errors and alarms caused by c-unknowns and ds-unknowns are more likely to be false alarms. Further, the cause points with i-unknown types are the sources for free variables in a program that operate in a partially defined environment, and failure to validate them mostly leads to an error due to certain assumptions made on the input values by user. The validated inputs are no longer unknowns due to the restrictions put during their validations. The implementation of lib functions generally adheres to the specification known to the user. However, many times the user misses to check the validity or the values returned to lib functions calls. Thus, the cause points of i-unknown and lib-unknown types are given higher priority. The cause point with p-unknown denotes presence of unsafe value and hence the infeasibility of the value reaching the alarm program point must be ensured. Furthermore, given the larger volume and high complexity of the application code in practice, the existence of a path carrying the unsafe value to the alarm program point in not likely. The cause points with loop-unknowns type includes the category of potentially infinite loops. The cause points of c-unknown and ds-unknown types are treated of lower priority because treating every complex arithmetic operation or every reading of a value from data structure itself reduces the probability of the cause point to cause an alarm as an error.

At the step 210, where the method applies a systematic approach using the grouping module 114 to group the cause points depending on their lexical similarity or proximity, wherein lexical similarity based grouping of similar cause points are grouped together so that their corresponding questions are answered together. It would be appreciated that the grouping of the cause points can be applied before or after the ranking of cause points based on their unknown-types. When a cause point cannot be grouped with any other cause point, it is treated as the only member of its own group. In the lexical similarity based grouping of similar cause points are grouped together so that answer to the questions or queries associated with the cause points in a group are answered together or in one go.

Finally, at the step 212, where the process performs an interactive static analysis to resolve alarms by accepting inputs from the user for each of the cause points generating the alarms. The interactive static analysis is performed in iterative fashion until no more alarms are generated by the static analysis module. The cause points and queries corresponding to cause points are reported using the interactive module 116 to the user to accept user inputs as answers to these queries using an interactive module. These user inputs accepted are supplied to step 202 and initiates next iteration to perform the static analysis again using the user inputs due to which the alarms corresponding to the answered cause points may get resolved. The process, the steps from 202 to 212, are repeated until no more alarms are generated by the static analysis.

Figure 3:
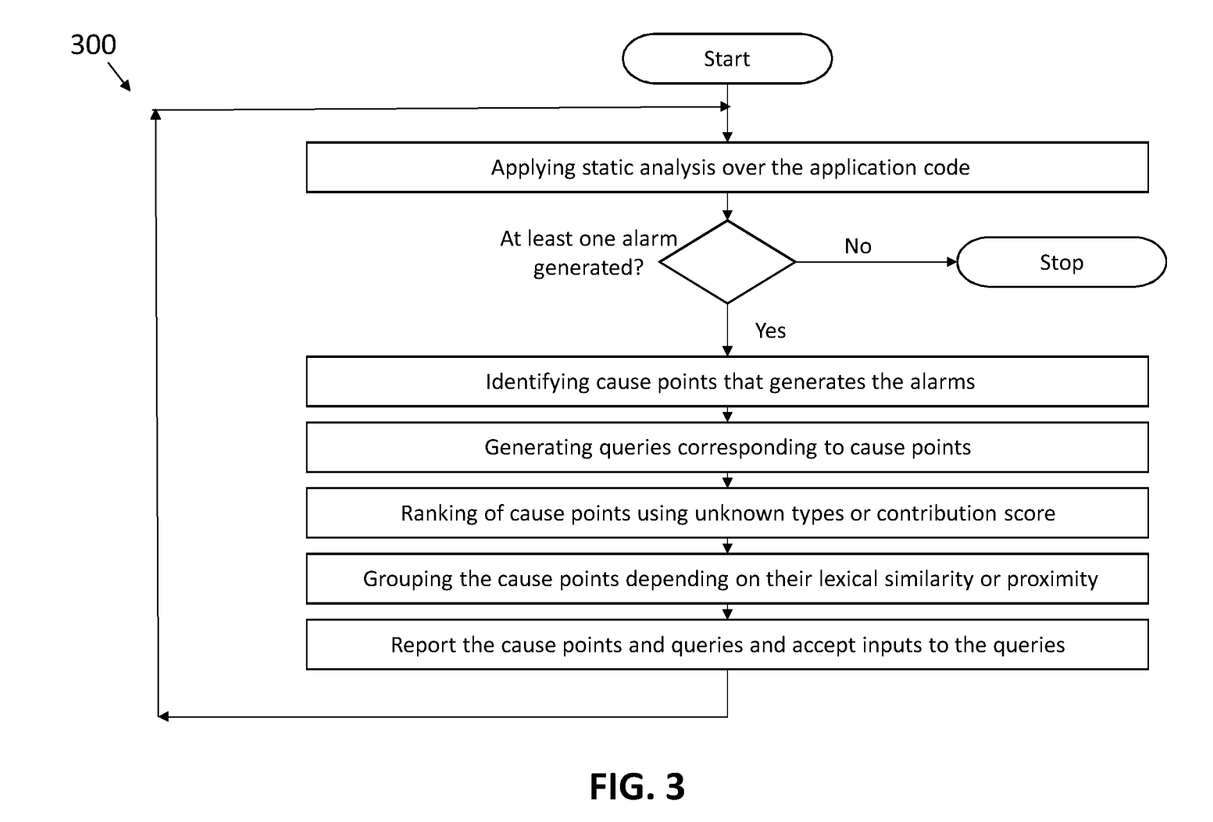
FIG. 3 is a schematic diagram showing a process for identifying at least one cause point of each one or more alarms of the static analysis and using the cause points for efficient and effective manual inspection of alarms according to an embodiment of the present disclosure.

Referring FIG. 3, wherein it is showing a flow chart for identifying at least one cause point of each of the one or more alarms resulting from the static analysis of the application code for inspection of the one or more alarms. It starts and applies static analysis over the application code to generate one or more alarms and if it generates at least one alarm the process moves to next step to identify at least one cause point to each of the generated one or more alarms. Further, the process classifies the cause points into various types depending on the program statements in which the cause point appears and source for imprecision of the analysis. Further, it has at least one unknown variable associated with the cause point. It would be noted that the sources of imprecision in static analysis are denoted as unknowns and these are variables for which values cannot be computed precisely during the static analysis of the application code. The sources of imprecision and program statements in which cause points appear, or thus the unknowns in the static analysis, may vary as per the programming languages like C, C++, and Java. Thus, it would be appreciated that the cause points identified and their different types may vary depending on the programming language of application code being checked by the static analysis.

Further, this process moves to next step and defines three metrics to prioritize the identified cause points and to rank the cause points accordingly. These metrics are cause point type, contribution score, and their similarity and spatial proximity. The ranking of cause points allows the user to review more number of alarms in a given time and also to identify more number of errors in a given time. Further, the proposed ranking scheme is customizable so that user can modify or customize the criteria used to rank the alarm cause points depending on his requirement. Information about the unknowns in the cause points is asked to user in the form of queries where every cause point identified has one or more queries associated with it. A systematic approach is used to frame the queries that are presented to the user. Using the user inputs that are answers to the queries, the static analysis is performed again due to which the alarms corresponding to the answered cause points may get resolved. The process is repeated until no more alarms are generated by the static analysis.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of number of alarms corresponding to each of the alarms generated while applying static analysis technique for defects detection in an application code for ensuring software quality and reliability of software. Static analysis usually results in plurality of alarms. A user is supposed to analyze each alarm manually. Each alarm requires dealing with utmost care, as the analysis of alarms is required to verify a software application. The review of alarm provides an assurance that there will be no system failure or an error at run-time by uncovering the true errors from the alarms generated through static analysis. This manual review of alarms is costlier, highly time consuming and tedious. Also, a repetitive manual review of alarms makes the analysis work of a user less interesting.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

I claim:

1. A system for identifying a plurality of cause points of one or more alarms in a static analysis over an application code, comprising:
 a memory;
 a processor communicatively coupled with the memory and configured to execute a plurality of instructions stored in the memory, wherein the processor executes the instructions to:
 carry out static analysis over the application code to analyze the application code for identifying programming errors and generate one or more alarms;
 identify a plurality of cause points for the one or more alarms generated during the static analysis, wherein the plurality of cause points of the one or more alarms are reasons due to which one or more values of program variables appearing in alarm expressions of the one or more alarms are unknowns during the static analysis of the application code, wherein the alarm expressions denote program expressions for which the one or more alarms are reported and the unknowns denote the program variables or program statements for which the static analysis is unable to compute their values as required during the static analysis of the application code;
 rank the identified cause points of the one or more alarms based on at least one of types of the unknowns or contribution score of the cause point in generation of the one or more alarms, wherein the unknowns are classified into plurality of types based on source for values of the unknowns; and
 group the ranked cause points depending on lexical similarity or spatial proximity of the ranked cause points, wherein the ranked cause points are grouped together to receive the one or more inputs for the corresponding unknowns in one go; and
 perform an interactive static analysis to resolve the one or more alarms by receiving one or more inputs from a user for the corresponding unknowns in one go,
 supply the one or more inputs provided by the user during the static analysis to initiate a next iteration of the static analysis of the application code using the one or more user inputs; and
 perform the next iteration of the static analysis which generates same number or lesser number of the alarms than the previous static analysis of the application code, wherein the interactive static analysis is performed in iterative fashion until no more alarms are generated.

2. The system claimed in claim 1, wherein the processor is further configured to:
 receive the one or more inputs from the user by generating one or more queries corresponding to each of the identified cause points, wherein the one or more queries are generated by identifying required values for each of the one or more unknowns at each of the cause points, wherein with the required values the correspondingly generated alarms are safe program points, wherein the required value represent necessary pre-condition on the unknown such that the value never result the alarms into an error, wherein the one or more inputs from the user are received for each of the cause points generating the one or more alarms as answers to the queries presented to the user, wherein the one or more queries are framed by inferring values of the unknown depending on the alarm expression and the verification property and by propagating the inferred values of the unknown from the alarm point to the cause point through background substitution of the values for transitively dependent variables.

3. The system claimed in claim 1, wherein the one or more alarms include array out of bound (AIOB), divide by zero (ZD), and overflow underflow (OFUF).

4. The system claimed in claim 1, wherein the origin of the unknown values is either an expression in program statement or a loop statement, wherein the unknown values are treated as non-deterministic choices from one or more values possible for an unknown variable during the static analysis.

5. The system claimed in claim 1, wherein one or more reasons for the unknowns are modeled as cause points of various types, wherein each cause point is an association of an unknown, an unknown-type, and the program statement where the unknown is observed.

6. The system claimed in claim 1, wherein the cause points within the groups are further ranked based on the contribution score of the cause points in an order of high to low contribution score.

7. A method for identifying a plurality of cause points of one or more alarms in a static analysis over an application code, comprising:
 carrying out static analysis, by a processor, over the application code to analyze the application code for identifying programming errors and generating one or more alarms; and
 identifying, by the processor, a plurality of cause points for one or more alarms generated during the static analysis, wherein the plurality of cause points of the one or more alarms are reasons due to which one or more values of program variables appearing in alarm expressions of the one or more alarms are unknowns during the static analysis of the application code, wherein the alarm expressions denote program expressions for which the one or more alarms are reported and the unknowns denote the program variables or program statements for which the static analysis is unable to compute their values as required during the static analysis of the application code;
  ranking the identified cause points of the one or more alarms based on at least one of types of the unknowns or contribution score of the cause point in generation of the one or more alarms, wherein the unknowns are classified into the plurality of types based on source for values of the unknowns; and
  group the ranked cause points depending on lexical similarity or spatial proximity of the ranked cause points, wherein the ranked cause points are grouped together to receive the one or more inputs for the corresponding unknowns in one go;
performing an interactive static analysis to resolve the one or more alarms by receiving one or more inputs from a user for the corresponding unknowns in one go;
supplying the one or more inputs provided by the user, during the static analysis to initiate a next iteration of the static analysis of the application code using the one or more user inputs; and
perform the next iteration of the static analysis which generates same number or lesser number of the alarms than the previous static analysis of the application code, wherein the interactive static analysis is performed in iterative fashion until no more alarms are generated.

8. The method claimed in claim 7, further comprising:
receiving the one or more inputs from the user by generating, by the processor, one or more queries corresponding to each of the identified cause points, wherein the one or more queries are generated by identifying required values for each of the one or more unknowns at each of the cause points, wherein with the required values the correspondingly generated alarms are safe program points, wherein the required value represent necessary pre-condition on the unknown such that the value never result the alarms into an error, wherein the one or more inputs from the user are received for each of the cause points generating the one or more alarms as answers to the queries presented to the user, wherein the one or more queries are framed by inferring values of the unknown depending on the alarm expression and the verification property and by propagating the inferred values of the unknown from the alarm point to the cause point through background substitution of the values for transitively dependent variables.

9. The method claimed in claim 7, wherein the one or more alarms include array out of bound (AIOB), divide by zero (ZD) and overflow underflow (OFUF).

10. The method claimed in claim 7, wherein the origin of the unknown values is either an expression in program statement or a loop statement, wherein the unknown values are treated as non-deterministic choices from one or more values possible for an unknown variable during the static analysis.

11. The method claimed in claim 7, wherein one or more reasons for the unknowns are modeled as cause points of various types, wherein each cause point is an association of an unknown, an unknown-type, and the program statement where the unknown is observed.

12. The method claimed in claim 7, wherein the cause points within the groups are further ranked based on the contribution score of the cause points in an order of high to low contribution score.

13. The system claimed in claim 1, wherein the types of the unknowns comprise- 'i-unknowns' arising due to at least one of i) unknown values of program inputs, or ii) the values received as input from the user, a network, a file or sensors, or linked at load-time; 'c-unknowns' resulting from approximation of complex computations in the application code; 'loop-unknowns' generated due to loops whose bounds cannot be determined statically; 'ds-unknowns' resulting due to abstracting the values of unbounded data structures; 'lib-unknowns' resulting from calls to library or external functions whose body is not available for the static analysis; 'p-unknowns' corresponding to not knowing infeasibility of execution paths carrying known but unsafe value to the alarm program point, wherein the identified cause points are ranked in an order of high to low priority, wherein the one or more alarms caused by the cause points of high priority are true errors and the one or more alarms caused by the cause points of low priority are false alarms, wherein the cause points are ranked based on the types of unknowns in an order of i-unknown>lib-unknown>p-unknown>loop-unknown>c-unknown>ds-unknown, wherein the alarms caused by i-unknowns and lib-unknowns are true errors and the alarms caused by c-unknowns and ds-unknowns are false alarms.

14. The method claimed in claim 7, wherein the types of the unknowns comprise 'i-unknowns' arising due to i) unknown values of program inputs or ii) the values received as input from the user, a network, a file or sensors, or linked at load-time; 'c-unknowns' resulting from approximation of complex computations in the application code; 'loop-unknowns' generated due to loops whose bounds cannot be determined statically; 'ds-unknowns' resulting due to abstracting the values of unbounded data structures; 'lib-unknowns' resulting from calls to library or external functions whose body is not available for the static analysis; 'p-unknowns' corresponding to not knowing infeasibility of execution paths carrying known but unsafe value to the alarm program point, wherein the identified cause points are ranked in an order of high to low priority, wherein the one or more alarms caused by the cause points of high priority are true errors and the one or more alarms caused by the cause points of low priority are false alarms, wherein the cause points are ranked based on the types of unknowns in an order of i-unknown>lib-unknown>p-unknown>loop-unknown>c-unknown>ds-unknown, wherein the alarms caused by i-unknowns and lib-unknowns are true errors and the alarms caused by c-unknowns and ds-unknowns are false alarms.

* * * * *